(12) United States Patent
Imahori et al.

(10) Patent No.: US 12,503,779 B2
(45) Date of Patent: Dec. 23, 2025

(54) ELECTROLYTE SOLUTION PRODUCTION DEVICE

(71) Applicant: Panasonic Intellectual Property Management Co., Ltd., Osaka (JP)

(72) Inventors: Osamu Imahori, Shiga (JP); Kenichiro Inagaki, Shiga (JP); Tomohiro Yamaguchi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 444 days.

(21) Appl. No.: 17/787,838

(22) PCT Filed: Nov. 10, 2020

(86) PCT No.: PCT/JP2020/041834
§ 371 (c)(1),
(2) Date: Jun. 21, 2022

(87) PCT Pub. No.: WO2021/161601
PCT Pub. Date: Aug. 19, 2021

(65) Prior Publication Data
US 2023/0022963 A1   Jan. 26, 2023

(30) Foreign Application Priority Data
Feb. 14, 2020   (JP) ................... 2020-023386

(51) Int. Cl.
  *C25B 9/23*   (2021.01)
  *C02F 1/461*   (2023.01)
  (Continued)

(52) U.S. Cl.
  CPC ............. *C25B 9/23* (2021.01); *C02F 1/46104* (2013.01); *C02F 1/4672* (2013.01); *C25B 1/13* (2013.01);
  (Continued)

(58) Field of Classification Search
  CPC .... C25B 1/13; C25B 9/23; C25B 9/60; C25B 9/63; C25B 13/02; C02F 1/46104;
  (Continued)

(56) References Cited

U.S. PATENT DOCUMENTS 6,287,431 B1 * 9/2001 Murphy .................... C25B 9/23
                                                                204/252
6,929,765 B2 * 8/2005 Cotton ................. B01D 65/003
                                                                264/273
(Continued)

FOREIGN PATENT DOCUMENTS

JP   2003-501243 A   1/2003
JP   2010-119990 A   6/2010
(Continued)

OTHER PUBLICATIONS

English Translation of TW Search Report dated May 2, 2024 for the related TW Patent Application No. 109139969.
(Continued)

*Primary Examiner* — Luan V Van
*Assistant Examiner* — Alexander R. Parent
(74) *Attorney, Agent, or Firm* — Rimon P.C.

(57) ABSTRACT

An electrolyte solution production device includes an electrolysis unit and a housing in which the electrolysis unit is disposed. The electrolysis unit is configured to electrolyze a liquid, and includes a stacked body having a cathode, an anode, and a conductive film between the cathode and the anode, the cathode and the anode constituting electrodes adjacent to each other. the housing includes an inflow port through which the liquid is supplied to the electrolysis unit and an outlet port through which an electrolyte solution produced in the electrolysis unit flows out from the electrolysis unit. The conductive film includes a protrusion that
(Continued)

protrudes toward an inner surface of the housing and positions the conductive film with respect to the housing.

16 Claims, 8 Drawing Sheets

(51) Int. Cl.
  *C02F 1/467* (2023.01)
  *C25B 1/13* (2006.01)
  *C25B 9/63* (2021.01)
  *C25B 13/02* (2006.01)

(52) U.S. Cl.
  CPC ............... *C25B 9/63* (2021.01); *C25B 13/02* (2013.01); *C02F 2001/46147* (2013.01); *C02F 2201/46115* (2013.01); *C02F 2201/4616* (2013.01); *C02F 2201/782* (2013.01); *C02F 2307/12* (2013.01)

(58) Field of Classification Search
  CPC ...... C02F 2201/46115; C02F 2201/782; C02F 2307/12; C02F 2201/4616
  USPC .................................................. 204/282–283
  See application file for complete search history.

(56) References Cited

U.S. PATENT DOCUMENTS

| | | | | |
|---|---|---|---|---|
| 8,993,190 B2* | 3/2015 | Fukuta | ............... | H01M 8/0297 |
| | | | | 429/454 |
| 9,023,552 B2* | 5/2015 | Nakanishi | ........... | H01M 8/1023 |
| | | | | 429/483 |
| 2002/0163101 A1 | 11/2002 | Cotton et al. | | |
| 2016/0060771 A1* | 3/2016 | Haryu | ....................... | C25B 1/04 |
| | | | | 204/258 |
| 2019/0055144 A1 | 2/2019 | Inagaki et al. | | |
| 2020/0017984 A1 | 1/2020 | Inagaki et al. | | |

FOREIGN PATENT DOCUMENTS

| | | |
|---|---|---|
| JP | 2017-176993 A | 10/2017 |
| JP | 2020-011179 A | 1/2020 |
| JP | 2020-011180 A | 1/2020 |
| TW | 201034978 A | 10/2010 |
| WO | 00/075082 A1 | 12/2000 |

OTHER PUBLICATIONS

International Search Report issued on Jan. 19, 2021 in International Application No. PCT/JP2020/041834, with English translation.
The EPC Office Action dated Apr. 12, 2023 for the related European Patent Application No. EP20918346.6.

* cited by examiner

ELECTROLYTE SOLUTION PRODUCTION DEVICE

CROSS-REFERENCE OF RELATED APPLICATIONS

This application is the U.S. National Phase under 35 U.S.C. § 371 of International Patent Application No. PCT/JP2020/041834, filed on Nov. 10, 2020, which in turn claims the benefit of Japanese Patent Application No. 2020-023386, filed on Feb. 14, 2020, the entire disclosures of which Applications are incorporated by reference herein.

TECHNICAL FIELD

The present disclosure relates to an electrolyte solution production device.

BACKGROUND ART

There is conventionally known an electrolyte solution production device including an electrolysis unit that electrolyzes a liquid and a housing in which the electrolysis unit is disposed (see, for example, PTL 1). The electrolysis unit has a stacked body in which a conductive film is stacked so as to be interposed between electrodes adjacent to each other.

The electrolyte solution production device includes an inflow port into which the liquid supplied to the electrolysis unit flows and an outlet port from which an electrolyte solution produced in the electrolysis unit flows out, the inflow port and the outlet port being provided in the housing. The above electrolyte solution production device electrolyzes water as the liquid supplied to the electrolysis unit by applying voltage to the electrolysis unit to produce ozone as an electrolytic product. The electrolyte solution production device dissolves the produced ozone in the water to produce ozone water as an electrolyte solution.

In the electrolyte solution production device of PTL 1, the conductive film constituting the stacked body is disposed such that the outer edge thereof is in contact with the inner surface of the housing. Thus, the conductive film constituting the stacked body is positioned with respect to the housing.

However, regarding the positioning of the conductive film with respect to the housing, when the conductive film is downsized, the outer edge of the conductive film cannot be brought into contact with the inner surface of the housing. Therefore, the downsizing and the positioning of the conductive film cannot be achieved together.

CITATION LIST

Patent Literature

PTL 1: Unexamined Japanese Patent Publication No. 2017-176993

SUMMARY OF THE INVENTION

The present disclosure provides an electrolyte solution production device in which a conductive film can be downsized and positioned with respect to a housing.

The electrolyte solution production device according to the present disclosure includes: a stacked body having a cathode, an anode, and a conductive film interposed between the cathode and the anode, the cathode and the anode constituting electrodes adjacent to each other, and an electrolysis unit configured to electrolyze a liquid; and a housing in which the electrolysis unit is disposed. The housing includes an inflow port through which the liquid is supplied to the electrolysis unit and an outlet port through which an electrolyte solution produced in the electrolysis unit flows out from the electrolysis unit. The conductive film includes a protrusion that protrudes toward an inner surface of the housing and positions the conductive film with respect to the housing.

The present disclosure can provide an electrolyte solution production device in which a conductive film can be downsized and positioned with respect to a housing.

DESCRIPTION OF EMBODIMENT

An exemplary embodiment is described below in detail with reference to the drawings. However, unnecessarily detailed description may be omitted. For example, a detailed description of a well-known matter or a repeated description of substantially the same configuration may be omitted.

Note that the accompanying drawings and the following description are provided for those skilled in the art to fully understand the present disclosure, and are not intended to limit the subject matter described in the claims.

Hereinafter, an ozone water production device is described as an example of the electrolyte solution production device. The ozone water production device generates ozone as an electrolytic product and dissolves ozone in water as a liquid to produce ozone water as an electrolyte solution. The ozone water has advantages of not being persistent and not generating by-products, and is effective for sterilization and decomposition of organic substances. Therefore, the ozone water is widely used in the water treatment fields and the food and medical fields.

Note that in the following description, an extending direction of a flow path (flowing direction of the liquid) is referred to as liquid flowing direction X, a width direction of the flow path (direction crossing the liquid flowing direction) is referred to as width direction Y, and a direction in which electrodes and a conductive film are stacked is referred to as stacking direction Z. In the present exemplary embodiment, stacking direction Z is defined as a vertical direction, and the side of an electrode case lid of the housing is defined as an upper side.

Furthermore, description is made below while referring, as specific examples, ozone as an electrolytic product, water as a liquid, and ozone water as an electrolyte solution.

Exemplary Embodiment

Hereinafter, electrolyte solution production device 1 according to the exemplary embodiment of the present disclosure is described with reference to FIGS. 1 to 8.

As shown in FIGS. 1 to 8, electrolyte solution production device 1 of the present exemplary embodiment includes electrolysis unit 11, housing 13, elastic body 27, and others.

As shown in FIGS. 1 to 4, electrolysis unit 11 has stacked body 9. Stacked body 9 includes cathode 3 and anode 5 constituting adjacent electrodes, conductive film 7, power feeder 23, and others. Hereinafter, in the case of not distinguishing cathode 3 and anode 5 from each other, these two may be simply described as "electrodes".

Cathode 3 is formed using, for example, titanium. Cathode 3 is formed in, for example, a rectangular plate shape with liquid flowing direction X as the longitudinal direction, width direction Y as the short side direction, and stacking direction Z as the thickness direction. Further, cathode 3 is electrically connected to feed shaft 3b for cathode at one end of cathode 3 in the longitudinal direction (downstream side in liquid flowing direction X) via spiral spring 3a. Feed shaft 3b is electrically connected to a negative electrode of a power supply unit (not illustrated).

Further, cathode 3 has a plurality of cathode holes 3c formed by penetrating in the thickness direction (stacking direction Z). Each of the plurality of cathode holes 3c is formed in a substantially identical (including identical) shape such as a V shape toward the longitudinal direction (liquid flowing direction X). The plurality of cathode holes 3c is provided so as to be aligned in a row at a predetermined pitch along the longitudinal direction (liquid flowing direction X). The shape and arrangement of cathode holes 3c are not limited to the above form, and may be another form such as a straight line shape "11111" similar to conductive film holes 7a. Further, it is sufficient that at least one cathode hole 3c is formed in cathode 3.

Anode 5 is formed, for example, by forming a conductive diamond membrane on a conductive substrate formed by using silicon. The conductive diamond membrane has conductivity by boron doping and is formed on the conductive substrate by a plasma chemical vapor deposition (CVD) method. Anode 5 is formed in, for example, a rectangular plate shape with liquid flowing direction X as the longitudinal direction, width direction Y as the short side direction, and stacking direction Z as the thickness direction. Further, two anodes 5 are arranged side by side along the longitudinal direction (liquid flowing direction X). Note that the reason for constituting the anode with two sheets is that the conductive substrate is made of a material such as a silicon wafer that is weak against impact and the conductive substrate is easily broken in an elongated shape; therefore, the length of each of the two sheets is shortened to make the conductive substrate difficult to break. Then, anode 5 is stacked with cathode 3 such that conductive film 7 is interposed therebetween in stacking direction Z.

Conductive film 7 of stacked body 9 is formed using, for example, a proton conductive type ion exchange film. Conductive film 7 is formed in, for example, a rectangular plate shape with liquid flowing direction X as the longitudinal direction, width direction Y as the short side direction, and stacking direction Z as the thickness direction. Further, conductive film 7 has a plurality of conductive film holes 7a formed by penetrating in the thickness direction (stacking direction Z).

Each of the plurality of conductive film holes 7a is formed in a substantially identical (including identical) shape such as a long hole shape extending in the short side direction (width direction Y). That is, the plurality of conductive film holes 7a are provided so as to be aligned in a row at a predetermined pitch along the longitudinal direction (liquid flowing direction X). The pitch of the plurality of conductive film holes 7a may be the same as the pitch of cathode holes 3c, or may be different from the pitch of cathode holes 3c. The shape and arrangement of conductive film holes 7a are not limited to the above form, and may be another form such as a V shape "<<<<<" similar to cathode holes 3c. Further, it is sufficient that at least one conductive film hole 7a is formed in conductive film 7.

Power feeder 23 is formed using, for example, titanium. Power feeder 23 is formed in, for example, a rectangular plate shape with liquid flowing direction X as the longitudinal direction, width direction Y as the short side direction, and stacking direction Z as the thickness direction. Further, power feeder 23 is electrically connected to feed shaft 23b for anode at the other end of power feeder 23 in the longitudinal direction (upstream side in liquid flowing direction X) via spiral spring 23a. Feed shaft 23b is electrically connected to a positive electrode of the power supply unit (not illustrated). Power feeder 23 is stacked on one surface side of anode 5 in stacking direction Z, and is disposed in contact with anode 5. With this configuration, power feeder 23 is electrically connected to anode 5.

That is, in stacked body 9 of the present exemplary embodiment, power feeder 23, anode 5, conductive film 7, and cathode 3 are stacked in this order from the lower side in stacking direction Z. Stacked body 9 has, in a portion of conductive film 7 stacked between cathode 3 and anode 5, interface 29 formed between cathode 3 and conductive film 7, and interface 31 formed between anode 5 and conductive film 7. Further, in a portion of stacked body 9 where cathode 3 and conductive film 7 are stacked, cathode holes 3c and conductive film holes 7a communicate with each other in stacking direction Z. Then, groove 33 is defined by conductive film 7, cathode hole 3c, and conductive film hole 7a. At this point, at least a part of interface 29 and interface 31 is exposed to groove 33. Further, groove 33 opens into flow path 35 described later through which liquid such as water flows. As a result, the water flows through groove 33.

In electrolysis unit 11 having stacked body 9, first, the water flows through flow path 35, and then the water flows into groove 33. When voltage is applied between cathode 3 and anode 5 by the power supply unit in a state where the water is flowing, a potential difference is generated between cathode 3 and anode 5 via conductive film 7. This potential difference energizes cathode 3, anode 5, and conductive film 7. Thus, the electrolysis is performed mainly in the water in groove 33, and ozone as an electrolytic product is generated in the vicinity of interface 31 between anode 5 and conductive film 7. The ozone thus generated dissolves in the water while being carried to the downstream side of flow path 35 along the water flow. As a result, an electrolyte solution such as ozone water is produced. Note that electrolysis unit 11 described above is disposed in housing 13.

As shown in FIGS. 1 to 4, housing 13 of electrolyte solution production device 1 is formed of, for example, a non-conductive resin such as polyphenylene sulfide (PPS). Housing 13 includes electrode case 37, electrode case lid 39, and others.

Electrode case 37 of housing 13 has bottom wall 41 located on the lower side in stacking direction Z and peripheral wall 43. Peripheral wall 43 is erected upward from the peripheral edge of bottom wall 41 in stacking direction Z, and is formed continuously in the peripheral direction. That is, electrode case 37 is formed in, for example, a rectangular housing shape in which the upper side of peripheral wall 43 is opened. Peripheral wall 43 has flange 45 disposed at an upper end. Flange 45 extends outward in a planar direction parallel to liquid flowing direction X and width direction Y, and is formed continuously in the peripheral direction of peripheral wall 43.

Electrode case 37 further includes housing recess 47, a pair of through-holes 49, fitting protrusion 51, inflow port 15, outlet port 17, and others.

Housing recess 47 is formed in an inner space of electrode case 37 which is opened on the upper side of peripheral wall 43 and defined by inner surface 41a of bottom wall 41 and inner surface 43a of peripheral wall 43. Housing recess 47 has electrolysis unit 11, elastic body 27, and others housed from the opening side. Peripheral wall 43 has a plurality of positioning projections 53 formed on inner surface 43a. Positioning projections 53 are formed along liquid flowing direction X, and position cathode 3 of stacked body 9 with respect to housing 13.

The pair of through-holes 49 are respectively provided in the vicinity of ends on the downstream side and the upstream side in liquid flowing direction X of bottom wall 41 of housing recess 47. The pair of through-holes 49 are formed to penetrate bottom wall 41 in stacking direction Z. Feed shaft 3b of cathode 3 and feed shaft 23b of power feeder 23 are respectively inserted into the pair of through-holes 49 in a state where electrolysis unit 11 is housed in housing recess 47 of electrode case 37. Thereafter, below the pair of through-holes 49, each of O-ring 55, washer 57, spring washer 59, and hex nut 61 are assembled to each of feed shaft 3b and feed shaft 23b that are inserted. As a result, feed shaft 3b and feed shaft 23b are fixed to the pair of through-holes 49. In addition, this assembly stops the water inside housing recess 47.

Fitting protrusion 51 is erected upward from the upper surface (for example, from flange 45) of peripheral wall 43 in stacking direction Z, and is formed continuously in the peripheral direction. Fitting protrusion 51 is fitted with fitting recess 67 of electrode case lid 39 described later, and electrode case lid 39 is positioned with respect to electrode case 37. A plurality of fitting protrusions 51 may be discontinuously formed in the peripheral direction.

Inflow port 15 is provided in peripheral wall 43 of electrode case 37 at a portion located on the upstream side in liquid flowing direction X, and extends in a tubular shape toward the upstream side in liquid flowing direction X. Inflow port 15 is formed with, at the center thereof, hole 15a having a long hole shape penetrating peripheral wall 43 in liquid flowing direction X and communicating with housing recess 47. Inflow port 15 is connected with a pipe (not illustrated) for supplying water, and introduces the water into housing recess 47.

Outlet port 17 is provided in peripheral wall 43 of electrode case 37 at a portion located on the downstream side in liquid flowing direction X, and extends in a tubular shape toward the downstream side in liquid flowing direction X. Outlet port 17 is formed with, at the center thereof, a hole (not illustrated) with a long hole shape penetrating peripheral wall 43 in liquid flowing direction X and communicating with housing recess 47. Outlet port 17 is connected with a pipe (not illustrated) for discharging ozone water, and leads out the ozone water produced by electrolysis unit 11 in housing recess 47.

Figure 2:
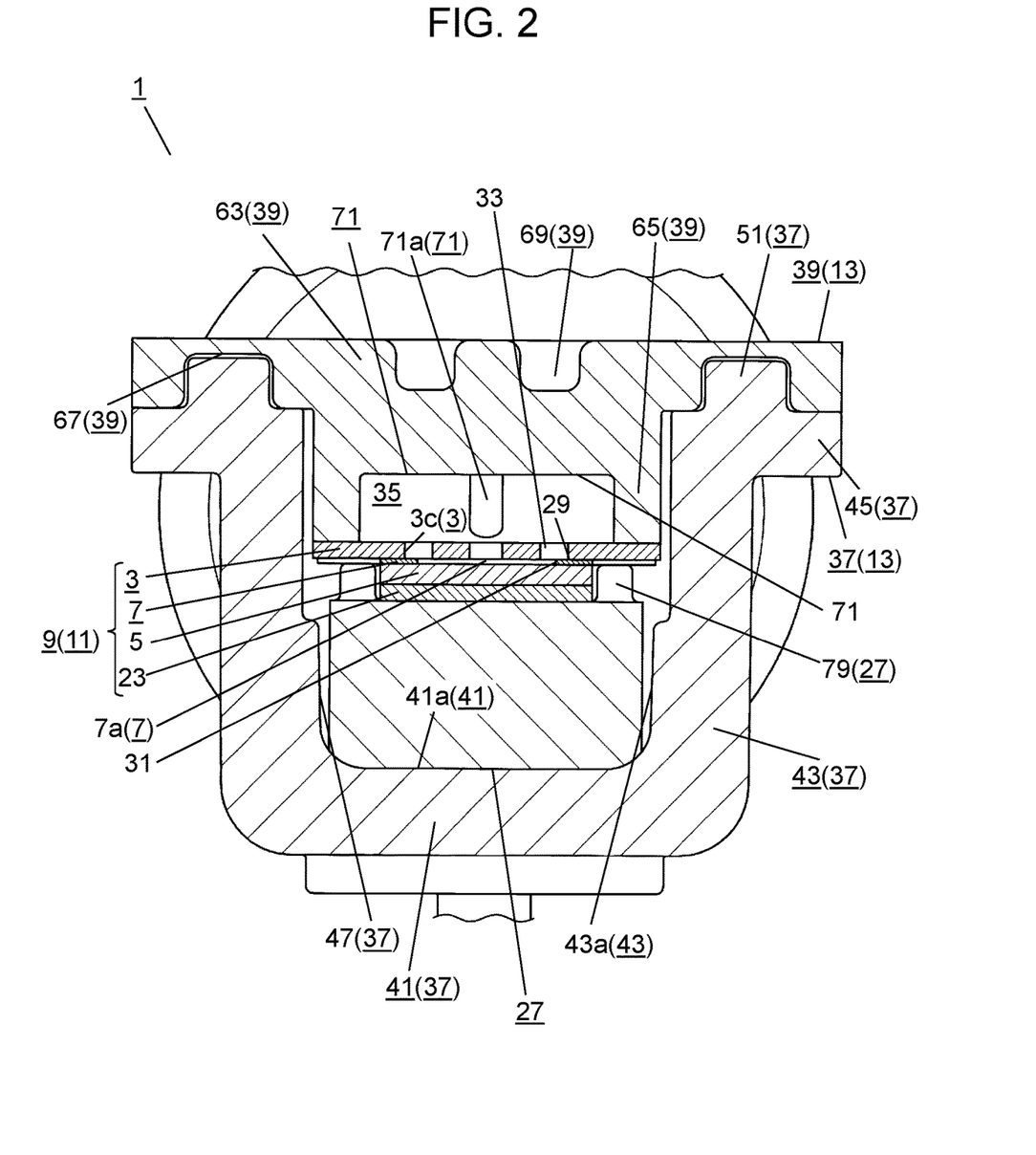
FIG. 2 is a cross-sectional view of the electrolyte solution production device according to the exemplary embodiment.
Figure 3:
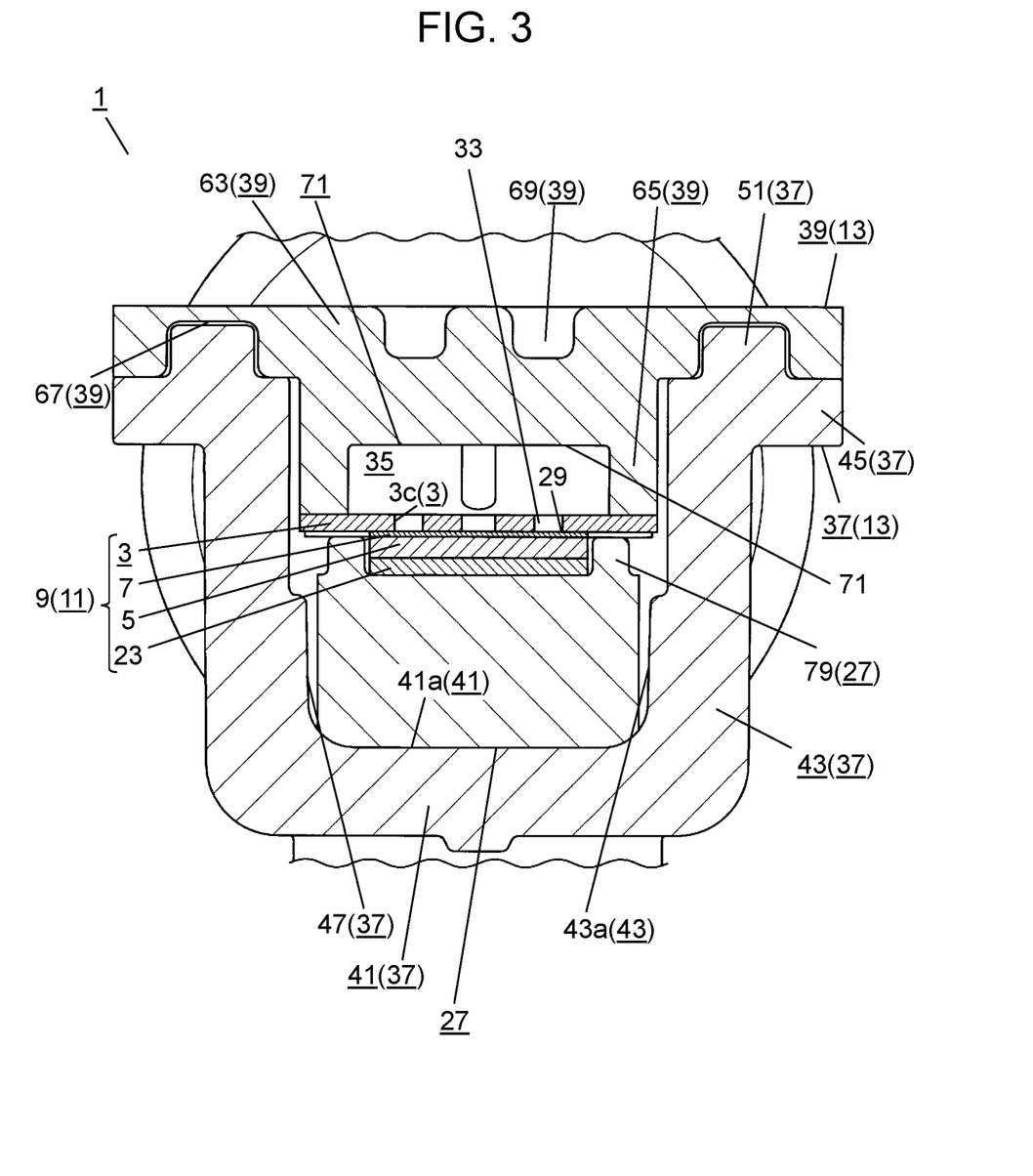
FIG. 3 is a cross-sectional view of the electrolyte solution production device according to the exemplary embodiment.
Figure 4:
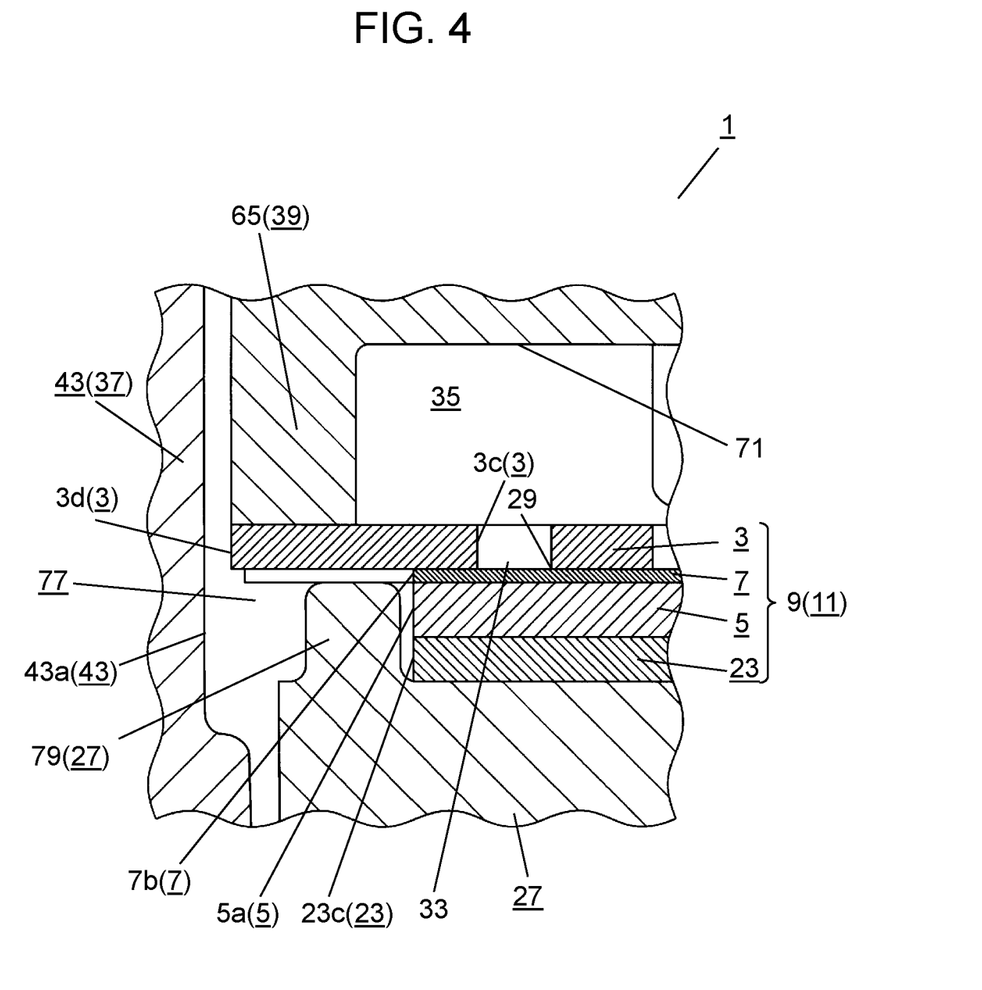
FIG. 4 is an enlarged view of a main part in FIG. 3.

In addition, as illustrated in FIGS. 2 to 4, electrode case lid 39 of housing 13 includes rectangular lid body 63 located on the upper side in stacking direction Z, flow path protrusion 65 erected downward in a rectangular shape from the lower surface of the center of lid body 63 in stacking direction Z, and others.

Lid body 63 has the outer shape formed to be substantially identical (including identical) to flange 45 of electrode case 37. That is, lid body 63 is configured to be able to close the opening of housing recess 47 of electrode case 37. Lid body 63 has fitting recess 67 which is continuously formed in the peripheral direction in the vicinity of the outer edge of the lower surface and can be fitted to fitting protrusion 51 of electrode case 37. The lower surface of lid body 63 is in contact with the upper surface of flange 45 of electrode case 37, and the contact surfaces thereof are welded in a state where fitting recess 67 is fitted to fitting protrusion 51. By this welding, the inside of housing 13 stops the water, and electrode case lid 39 is fixed to electrode case 37.

The fixing between electrode case 37 and electrode case lid 39 is not limited to the above welding method. For example, a sealing material may be interposed between electrode case 37 and electrode case lid 39, and electrode case 37 and electrode case lid 39 may be fixed by a fixing method such as screwing. In the case where the plurality of fitting protrusions 51 are discontinuously formed in the peripheral direction, the plurality of fitting recesses 67 may be formed discontinuously in the peripheral direction so as to match with the plurality of fitting protrusions 51, and the above protrusions and recesses may be fitted and welded to each other.

Further, lid body 63 has groove 69 formed on the upper surface. Groove 69 is used for such as positioning, catching, and reverse insertion prevention when, for example, electrolyte solution production device 1 is assembled to an instrument.

Flow path protrusion 65 is formed to have an outer shape substantially identical (including identical) to an inner edge of the opening of housing recess 47 of electrode case 37. The dimension of the outer surface of flow path protrusion 65 is set so as to have a slight gap with inner surface 43a of peripheral wall 43. This facilitates insertion of flow path protrusion 65 into housing recess 47 of electrode case 37.

Flow path protrusion 65 is inserted into housing recess 47 in a state where electrode case lid 39 is assembled to electrode case 37. Accordingly, the lower surface of electrode case lid 39 is brought into contact with the surface of cathode 3 of electrolysis unit 11 to press stacked body 9 of electrolysis unit 11 downward in stacking direction Z.

Flow path protrusion 65 includes flow path groove 71 formed at the center of the lower surface along liquid flowing direction X.

Flow path groove 71 is defined by a plurality of cylindrical projections 79 disposed along liquid flowing direction X at the center of flow path protrusion 65 in width direction Y. This provides two flow path grooves 71 in width direction Y of flow path protrusion 65. Each of flow path grooves 71 is open on the side opposing to cathode 3 and on both sides in liquid flowing direction X. The width of flow path groove 71 in width direction Y is set substantially equal (including equal) to the width of groove 33 of electrolysis unit 11 in width direction Y. With this setting, the water flowing in flow path groove 71 can be stably introduced into groove 33. In the state where flow path protrusion 65 is in contact with cathode 3, flow path groove 71 described above forms, with the surface of cathode 3, flow path 35 through which the water flows.

That is, the water introduced into housing 13 from inflow port 15 flows into flow path 35. The water flowing into flow path 35 flows through groove 33 of electrolysis unit 11 and is electrolyzed to produce ozone as an electrolytic product. The produced ozone is dissolved in the water flowing through flow path 35 to produce ozone water. The produced ozone water flows through flow path 35 and is led out of housing 13 from outlet port 17.

In electrolyte solution production device 1 of the present exemplary embodiment, elastic body 27 is disposed in housing 13 in which flow path 35 is formed.

Note that elastic body 27 illustrated in FIGS. 1 to 4 is constituted using, for example, an elastic body having an elastic force such as rubber, plastic, or a metal spring. Elastic body 27 is formed in a rectangular parallelepiped shape whose outer surface shape is substantially identical (including identical) to the inner surface shape of housing recess 47 of electrode case 37 on the side of bottom wall 41, and is configured to be housed in housing recess 47. In the state of being housed in housing recess 47, elastic body 27 has electrolysis unit 11 stacked on the upper side in stacking direction Z. Then, in the stacked state, electrode case lid 39 is assembled to electrode case 37. At this time, flow path protrusion 65 of electrode case lid 39 presses cathode 3 of stacked body 9 of electrolysis unit 11 downward in stacking direction Z. As a result, elastic body 27 is pressed downward in stacking direction Z.

At this point, elastic body 27 generates a repulsive force to restore toward the upper side in the stacking direction Z against the pressing. The repulsive force of elastic body 27 applies an upward biasing force in stacking direction Z to electrolysis unit 11. Accordingly, stacked body 9 of electrolysis unit 11 is brought into close contact with flow path protrusion 65 of electrode case lid 39 in stacking direction Z. Therefore, the contact in stacked body 9 is stabilized, and the energized area is maintained. As a result, the current density supplied to stacked body 9 can be equalized, and the electrolysis performance in electrolysis unit 11 can be stabilized. Note that a gap is formed between the outer surface of elastic body 27 and the inner surface of housing recess 47 in a free state where elastic body 27 is not pressed. This gap allows deformation of elastic body 27 when elastic body 27 is elastically deformed by pressing.

Elastic body 27 further includes positioning recess 73. Positioning recesses 73 are formed to penetrate in stacking direction Z and are disposed in plural numbers along liquid flowing direction X. The plurality of positioning protrusions 75 erected from bottom wall 41 of housing recess 47 of electrode case 37 are inserted into positioning recesses 73. By inserting positioning protrusions 75 into positioning recesses 73, elastic body 27 is positioned with respect to housing 13 in a planar direction parallel to liquid flowing direction X and width direction Y. At this time, in the free state of elastic body 27, a gap that allows deformation of elastic body 27 is formed between the inner surface of positioning recess 73 and the outer surface of positioning protrusion 75. This gap allows deformation of elastic body 27 similarly to the gap described before. Note that positioning recess 73 may be formed in a concave shape instead of the penetrating shape through which elastic body 27 penetrates in stacking direction Z.

As described above, in electrolyte solution production device 1 of the present first exemplary embodiment, the width of cathode 3 of stacked body 9 of electrolysis unit 11 in width direction Y is set to be substantially equal (including equal) to the width of flow path protrusion 65 of electrode case lid 39 in width direction Y. By setting the width of cathode 3 as described above, the openings of groove 33 formed by cathode holes 3c of cathode 3, conductive film holes 7a of conductive film 7, and anode 5 can be stably disposed with respect to flow path 35 formed between cathode 3 and flow path protrusion 65. Further, flow path protrusion 65 can stably press cathode 3 of electrolysis unit 11 downward in stacking direction Z.

The width of anode 5 of stacked body 9 in width direction Y is set to be narrower than the width of cathode 3 in width direction Y, and substantially equal to the width of conductive film 7 in width direction Y. By setting the widths of anode 5 and conductive film 7 as described above, expensive anode 5 and conductive film 7 can be downsized, and thus the cost can be reduced.

The width of power feeder 23 of stacked body 9 in width direction Y is set to be substantially equal (including equal) to the width of anode 5 in width direction Y. By setting the width of power feeder 23 as described above, the energization area for anode 5 can be secured while power feeder 23 is downsized. Therefore, energization to anode 5 can be stabilized, and the electrolysis performance in electrolysis unit 11 can be maintained.

The width of elastic body 27 in width direction Y is set to be wider than the widths of anode 5 and power feeder 23 of stacked body 9 in width direction Y. By setting the width of elastic body 27 as described above, the outer edge of elastic body 27 can be disposed on the outer periphery of anode 5 and power feeder 23. In addition, elastic body 27 can stably receive the pressing force applied from power feeder 23, the pressing force coming from flow path protrusion 65 of electrode case lid 39. Thus, the biasing force can be stably applied to stacked body 9 of electrolysis unit 11.

Note that in electrolyte solution production device 1, when a minute gap is formed between the outer periphery of electrolysis unit 11 and the inner surface of housing 13, there is a case of a liquid such as water entering and retaining in the minute gap. When ozone is produced by electrolyzing water in this state where the water is retained around electrolysis unit 11, the pH value of the water retaining around electrolysis unit 11 increases. As a result, scale mainly composed of a calcium component is likely to be generated around electrolysis unit 11. When the scale is generated, the scale possibly accumulates in the minute gap. When the scale is accumulated around electrolysis unit 11, there is a risk that electrolysis unit 11 and housing 13 are deformed by being compressed by the scale.

Therefore, as illustrated in FIG. 4, in electrolyte solution production device 1 of the present exemplary embodiment, space 77 for suppressing retention of water is formed between the outer periphery of electrolysis unit 11 and the inner surface of housing 13.

That is, space 77 is formed between inner surface 43a of peripheral wall 43 and the side surfaces of stacked body 9 on both sides in width direction Y. Specifically, space 77 is formed between inner surface 43a of peripheral wall 43 and each of side surface 3d of cathode 3, side surface 5a of anode 5, side surface 7b of conductive film 7, and side surface 23c of power feeder 23.

Space 77 is formed inside housing 13 along liquid flowing direction X on both sides of stacked body 9 in width direction Y, and communicates with inflow port 15 and outlet port 17. As a result, the water introduced from inflow port 15 flows through space 77 and is led out from outlet port 17. Therefore, the water is suppressed from retaining around electrolysis unit 11. By suppressing the water from retaining around electrolysis unit 11, scale is suppressed from being generated around electrolysis unit 11. As a result, the deformation of electrolysis unit 11 and housing 13 caused by accumulation of scale can be more reliably suppressed. Space 77 may be configured to communicate with the middle of flow path 35. Therefore, because the water in flow path 35 and the water in space 77 easily flow, the scale is suppressed from being generated by suppressing the water from retaining, and the effect of extending the life is exerted.

That is, in electrolyte solution production device 1 in which space 77 is formed, the width of anode 5 is formed narrower in width direction Y than the width of cathode 3 in electrolysis unit 11 in width direction Y. By narrowing the width of anode 5, anode 5 can be downsized. However, by downsizing anode 5, there is a possibility that anode 5 cannot be directly positioned with respect to housing 13.

Therefore, in electrolyte solution production device 1 of the present exemplary embodiment, as described above, at least anode 5 in stacked body 9 of electrolysis unit 11 is positioned by elastic body 27 positioned with respect to housing 13. That is, anode 5 is positioned in electrode case 37 of housing 13 with elastic body 27 interposed therebetween. Accordingly, even when anode 5 is downsized, anode 5 can be more reliably positioned with respect to housing 13.

Further, as shown in FIGS. 1 to 4 and FIG. 6, elastic body 27 of the present exemplary embodiment includes, at the peripheral edge of the upper surface, the plurality of projections 79 erected to project upward from the upper surface in stacking direction Z. The height of the plurality of projections 79 in the stacking direction Z is set to be substantially equal (including equal) to the total thickness of power feeder 23 and anode 5 so as to reach the height position of anode 5 of stacked body 9 stacked on elastic body 27. Thus, anode 5 can be positioned by the plurality of projections 79.

Among the plurality of projections 79, the plurality of projections 79 disposed along liquid flowing direction X on both sides in width direction Y are disposed so as to face, in width direction Y, side surfaces 5a of anode 5 and side surfaces 23c of power feeder 23 on both sides in width direction Y. Therefore, when anode 5 and power feeder 23 is made to move in width direction Y, anode 5 and power feeder 23 come into contact with projections 79. This restricts movement of anode 5 and power feeder 23 in width direction Y.

Among the plurality of projections 79, the plurality of projections 79 disposed on both sides in liquid flowing direction X are disposed so as to face, in liquid flowing direction X, side surfaces of anode 5 and power feeder 23 on both sides in liquid flowing direction X. Therefore, when anode 5 and power feeder 23 is made to move in liquid flowing direction X, anode 5 and power feeder 23 come into contact with projections 79. This restricts movement of anode 5 and power feeder 23 in liquid flowing direction X.

That is, the plurality of projections 79 restrict the movement of anode 5 and power feeder 23 in the planar direction parallel to liquid flowing direction X and width direction Y, which allows anode 5 and power feeder 23 to be positioned in the planar direction with respect to elastic body 27. Therefore, the contact between anode 5 and power feeder 23 can be stabilized, and the electrolysis performance in electrolysis unit 11 can be maintained. In addition, this restricts movement of anode 5 and power feeder 23 toward the side of space 77. As a result, space 77 formed in housing 13 can be stably maintained.

As described above, anode 5 positioned by elastic body 27 is configured such that the surface opposite to the side in contact with power feeder 23 in stacking direction Z of anode 5 is in contact with conductive film 7. Here, the width of conductive film 7 in width direction Y is set to be substantially equal (including equal) to the width of anode 5 in width direction Y. Therefore, conductive film 7 can be downsized similarly to anode 5.

However, by simply downsizing conductive film 7, there is a possibility that conductive film 7 cannot be positioned with respect to housing 13.

Figure 5:
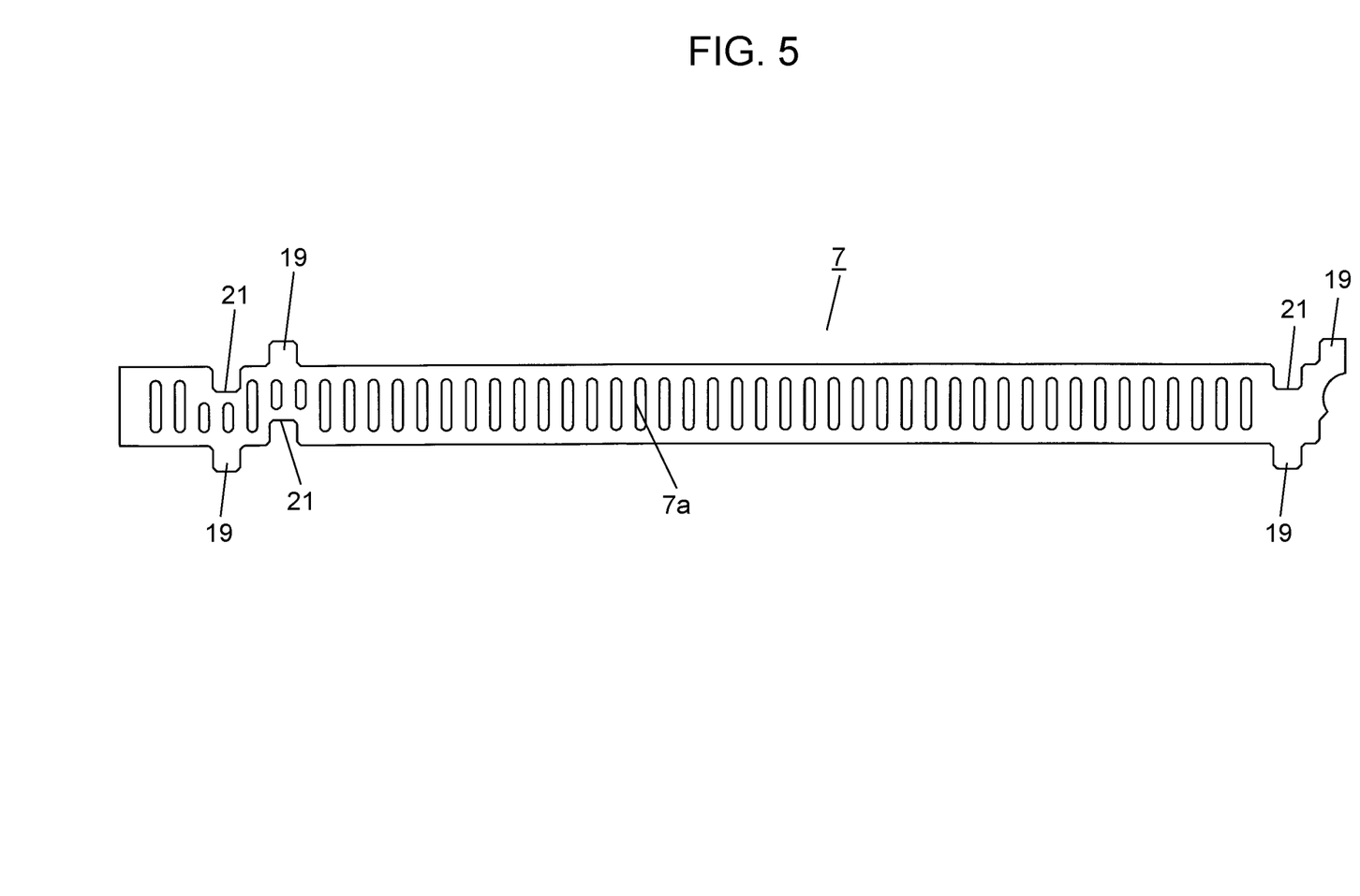
FIG. 5 is a top view of a conductive film of the electrolyte solution production device according to the exemplary embodiment.
Figure 6:
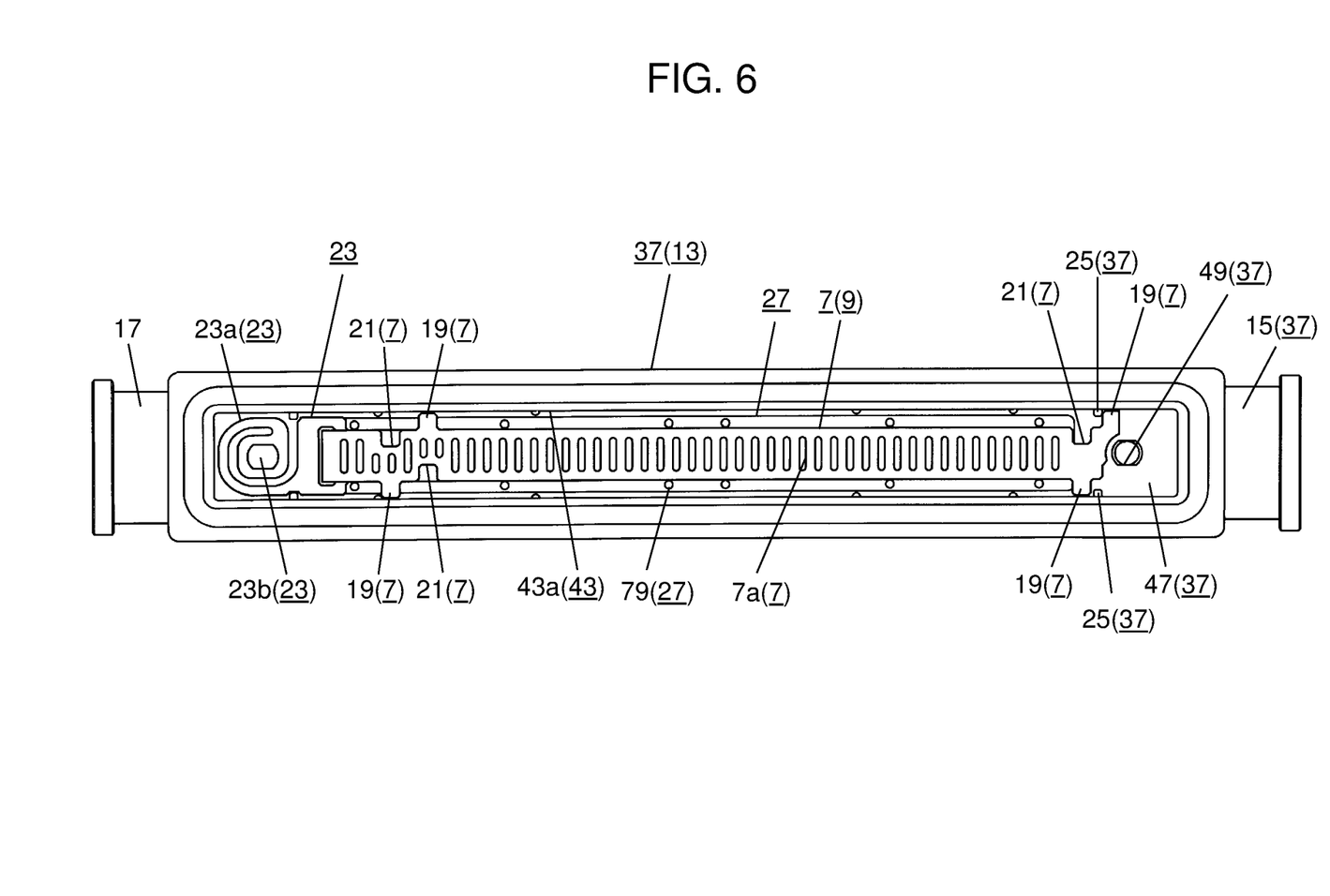
FIG. 6 is a top view illustrating a state where the conductive film is housed in an electrode case of a housing of the electrolyte solution production device according to the exemplary embodiment.
Figure 7:
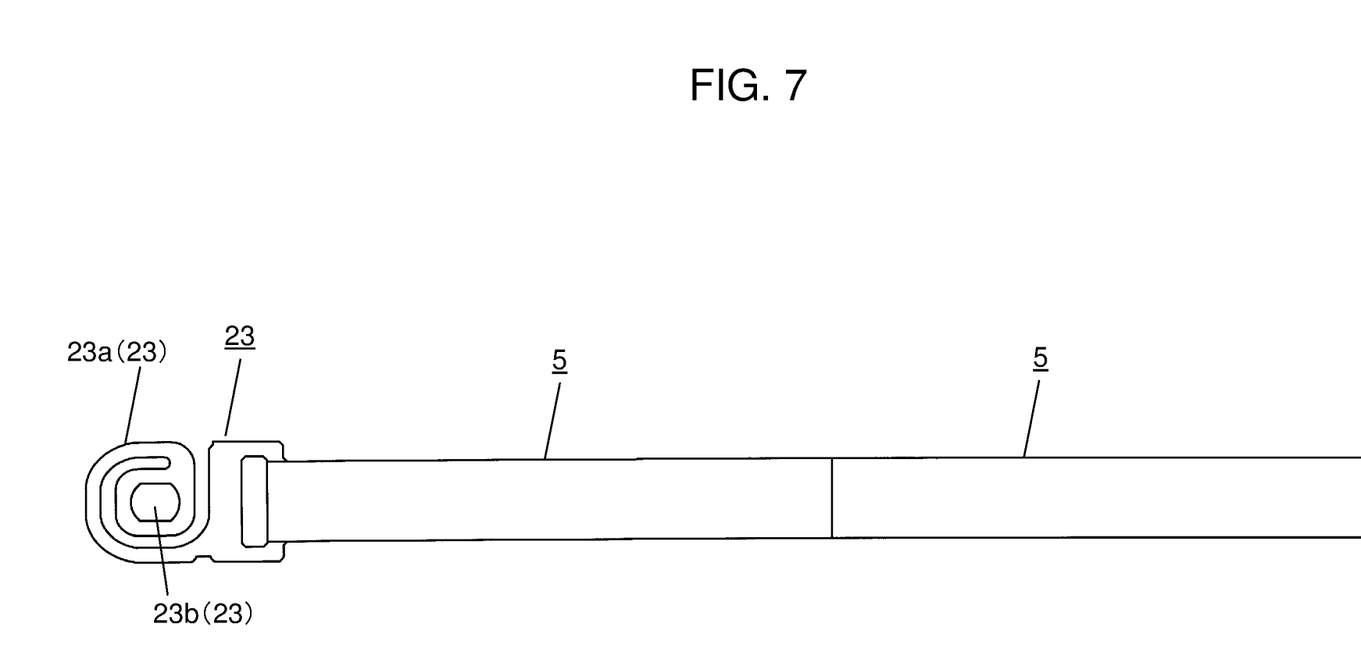
FIG. 7 is a top view illustrating a state where an anode is stacked on a power feeder of the electrolyte solution production device according to the exemplary embodiment.

Therefore, in the present exemplary embodiment, as illustrated in FIGS. 5 and 6, conductive film 7 is provided with protrusion 19 protruding toward the inner surface of housing 13. This protrusion 19 allows conductive film 7 to be positioned with respect to housing 13.

Hereinafter, the positioning of conductive film 7 and housing 13 is specifically described using FIGS. 5 and 6 while referring to FIG. 1.

In the following description, a thickness direction of conductive film 7 is defined as stacking direction Z, and a planar direction orthogonal to stacking direction Z is defined as a planar direction parallel to liquid flowing direction X and width direction Y. In addition, a predetermined one direction (for example, a first direction) among the planar directions is defined as width direction Y which is the short side direction of conductive film 7. Moreover, the other direction (for example, a second direction) orthogonal to the predetermined one direction is defined as liquid flowing direction X which is the longitudinal direction of conductive film 7.

Figure 1:
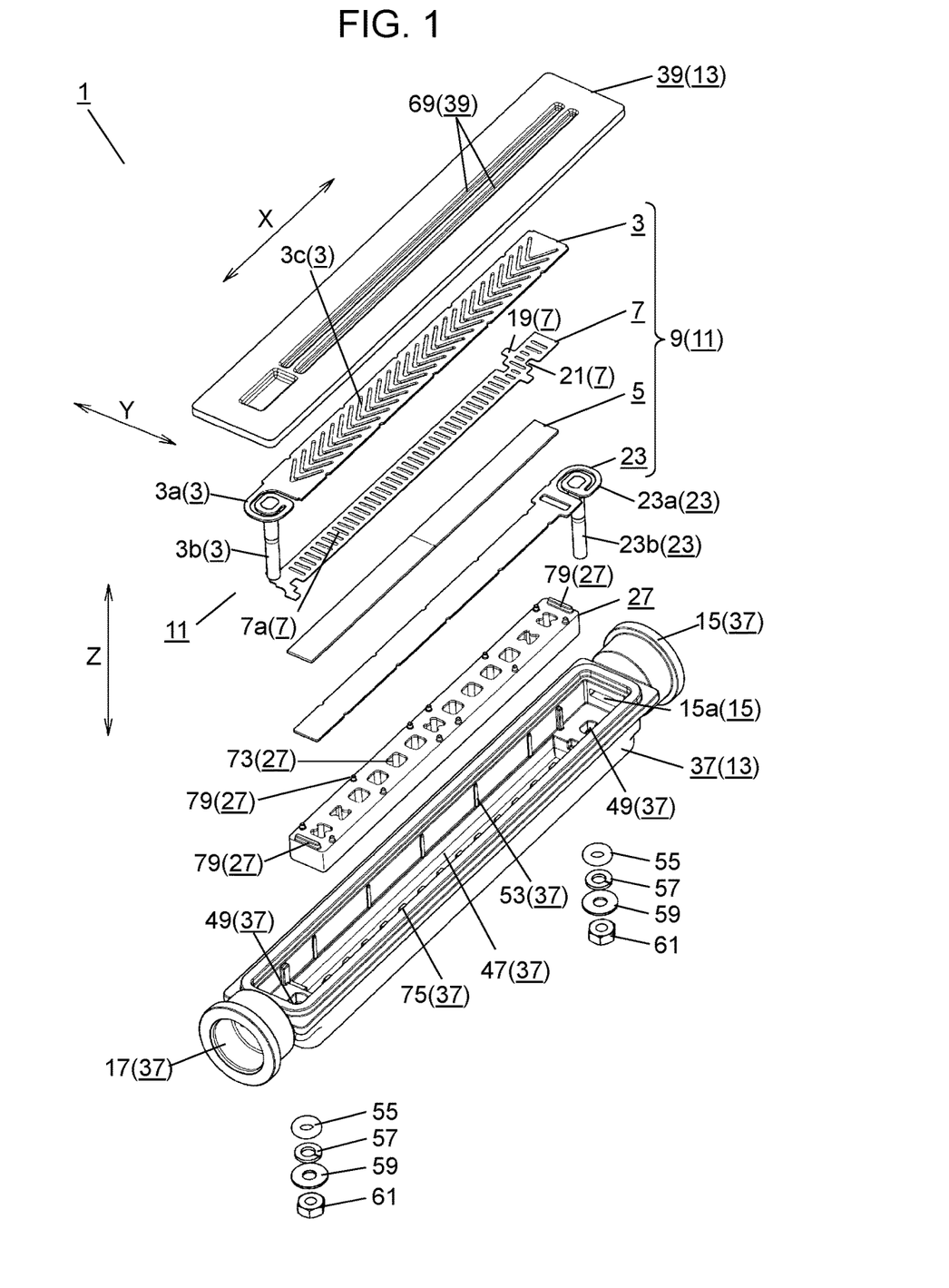
FIG. 1 is an exploded perspective view of an electrolyte solution production device according to the present exemplary embodiment.

As illustrated in FIG. 1, protrusions 19 of conductive film 7 are formed to respectively protrude from side surfaces 7b on both sides in the short side direction (width direction Y) of conductive film 7 toward inner surface 43a of peripheral wall 43 which is the inner surface of housing 13. Protrusions 19 are disposed close to each other such that positions thereof in the longitudinal direction (liquid flowing direction X) of conductive film 7 substantially face each other in the short side direction. Further, protrusions 19 are disposed in the vicinity of both sides in the longitudinal direction (liquid flowing direction X) of conductive film 7. That is, as described above, a plurality of (four in the present exemplary embodiment) protrusions 19 are provided for conductive film 7.

In this state, as illustrated in FIG. 6, the tip of protrusion 19 in the protruding direction comes into contact with inner surface 43a of peripheral wall 43 in a state where conductive film 7 is housed in housing 13. As a result, movement of conductive film 7 in width direction Y, or rotation of conductive film 7 on the plane parallel to liquid flowing direction X and width direction Y is restricted. Therefore, conductive film 7 is positioned with respect to housing 13. Thus, the concentration of ozone water as an electrolyte solution produced by electrolysis unit 11 can be produced as intended with high accuracy. Note that a configuration may be adopted in which a minute gap is formed between the tip of protrusion 19 in the protruding direction and inner surface 43a of peripheral wall 43.

In addition, housing 13 includes a pair of restriction parts 25 provided, for example, to respectively face protrusions 19 of conductive film 7 on the side of inflow port 15. Restriction parts 25 position conductive film 7 in liquid flowing direction X. Restriction parts 25 are respectively provided on inner surface 43a of peripheral wall 43 of electrode case 37, at positions of the inner surface facing each other in width direction Y. Each restriction part 25 protrudes from inner surface 43a of peripheral wall 43 toward the inside of housing recess 47, and is continuously formed along stacking direction Z.

Restriction parts 25 are disposed such that the side surfaces on different sides in liquid flowing direction X respectively face the side surfaces of protrusion 19 on different sides of liquid flowing direction X, protrusions 19 being respectively provided on both sides in the short side direction (width direction Y) of conductive film 7. That is, with respect to the vertical direction in FIG. 6, regarding protrusion 19 illustrated on the left side, the side surface on the side of outlet port 17 is arranged to face the side surface of restriction part 25 illustrated on the left side, on the side of inflow port 15. Further, with respect to the vertical direction in FIG. 6, regarding protrusion 19 illustrated on the right side, the side surface on the side of inflow port 15 is arranged to face the side surface of restriction part 25 illustrated on the right side, on the side of outlet port 17. Therefore, when conductive film 7 is made to move in liquid flowing direction X, corresponding protrusions 19 and restriction parts 25 come into contact with each other. This restricts movement of conductive film 7 in liquid flowing direction X. Therefore, conductive film 7 is positioned with respect to housing 13. Thus, the concentration of ozone water generated in electrolysis unit 11 can be produced as intended with high accuracy.

Further, with respect to the vertical direction in FIG. 6, conductive film 7 has recess 21 formed at a position opposite in the short side direction (width direction) to a portion where protrusion 19 on the right side is provided. The inner surface shape of recess 21 is substantially identical (including identical) to the outer surface shape of protrusion 19, or slightly larger than the outer surface shape of protrusion 19. In the case of cutting out the plurality of conductive films 7 from one base material and processing the same, recesses 21 are formed on adjacent conductive films 7 at the same time when protrusions 19 of adjacent conductive films 7 are formed. Accordingly, the amount of the base material of conductive film 7 used can be reduced.

Figure 8:
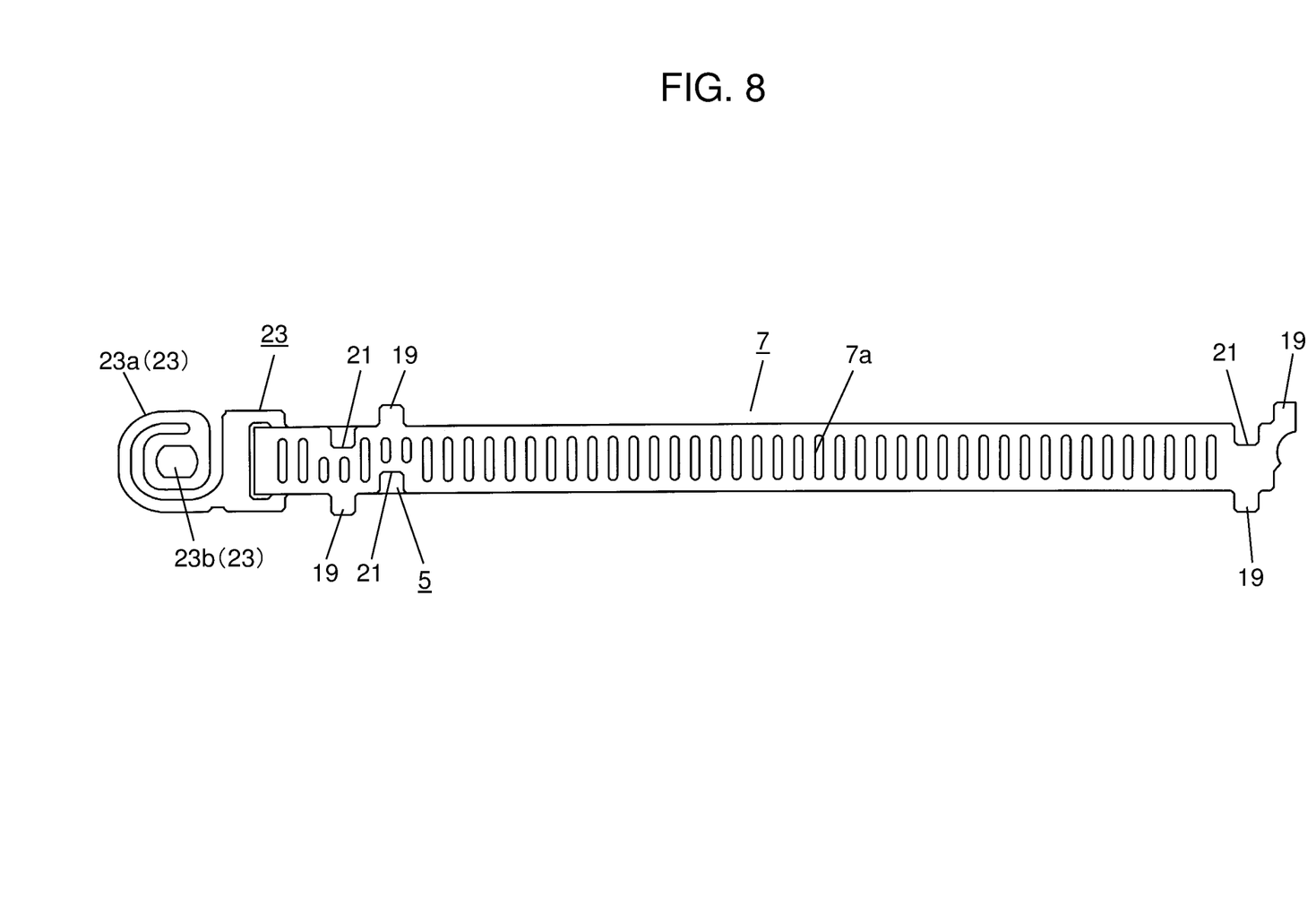
FIG. 8 is a top view illustrating a state where the conductive film is stacked on the anode and the power feeder of the electrolyte solution production device according to the exemplary embodiment.

As illustrated in FIG. 8, conductive film 7 is set so as not to largely protrude from anode 5 when stacked on anode 5. That is, conductive film 7 is disposed apart from power feeder 23 so as not to come into contact with power feeder 23 facing in stacking direction Z with anode 5 interposed therebetween. This avoids a current path that does not pass through anode 5 to be formed due to conductive film 7 coming into contact with power feeder 23. Therefore, decrease in ozone water generation efficiency can be more reliably prevented in electrolysis unit 11.

As described above, electrolyte solution production device 1 according to the present exemplary embodiment includes: stacked body 9 having conductive film 7 interposed and stacked between cathode 3 and anode 5 constituting electrodes adjacent to each other, and electrolysis unit 11 configured to electrolyze a liquid; and housing 13 having electrolysis unit 11 disposed in the inside of housing 13. Housing 13 includes inflow port 15 into which the liquid supplied to electrolysis unit 11 flows and outlet port 17 from which the electrolyte solution produced in electrolysis unit 11 flows out. In addition, conductive film 7 includes protrusion 19 that protrudes toward the inner surface of housing 13 and positions conductive film 7 with respect to housing 13.

With this configuration, even in the case where conductive film 7 is downsized, conductive film 7 can be positioned with respect to housing 13. Thus, the concentration of the electrolytic product of the electrolyte solution generated in electrolysis unit 11 can be produced as intended with high accuracy.

In other words, electrolyte solution production device 1 described above enables conductive film 7 to be downsized and conductive film 7 to be positioned with respect to housing 13.

Further, protrusions 19 are respectively provided on both sides in the predetermined one direction (width direction Y) among the plane direction orthogonal to the thickness direction (stacking direction Z) of conductive film 7. Still further, protrusions 19 on both sides in the predetermined one direction (width direction Y) are disposed such that positions thereof with respect to the other direction (liquid flowing direction X) orthogonal to the predetermined one direction (width direction Y) in the planar direction are close to each other. This can reduce positional variation of conductive film 7 in the rotational direction with respect to housing 13. Thus, the concentration of the electrolytic product of the electrolyte solution generated in electrolysis unit 11 can be produced as intended with high accuracy.

Further, protrusions 19 are provided on both sides in the other direction (liquid flowing direction X) orthogonal to the predetermined one direction (width direction Y) among the plane direction orthogonal to the thickness direction (stacking direction Z) of conductive film 7. This can reduce positional variation of conductive film 7 in the rotational direction with respect to housing 13. Thus, the concentration of the electrolytic product of the electrolyte solution generated in electrolysis unit 11 can be produced as intended with high accuracy.

Further, conductive film 7 includes recess 21 provided at the position opposite to the position where protrusion 19 is provided, in the predetermined one direction (width direction Y) among the plane direction orthogonal to the thickness direction (stacking direction Z) of conductive film 7. This allows protrusion 19 and recess 21 to be provided at the same position in the predetermined one direction (width direction Y) of conductive films 7 adjacent to each other in the base material. As a result, the electrolyte solution can be efficiently generated in electrolysis unit 11 including conductive film 7 formed using a small amount of the base material.

In addition, stacked body 9 includes power feeder 23 that is in contact with at least one electrode on the opposite side of conductive film 7. Further, conductive film 7 is disposed apart from power feeder 23. This allows conductive film 7 and power feeder 23 to come into contact with each other reliably, and thus avoids a current path that does not pass through the electrode to be formed. As a result, decrease in ozone water generation efficiency of the electrolyte solution in electrolysis unit 11 can be prevented.

In addition, housing 13 includes restriction part 25 that is disposed to face protrusion 19 and position conductive film 7 with respect to the other direction (liquid flowing direction X) orthogonal to the predetermined one direction (width direction Y) among the planar direction orthogonal to the thickness direction (stacking direction Z) of conductive film 7. This can reduce positional variation of conductive film 7 in the other direction (liquid flowing direction X) with respect to housing 13. Thus, the concentration of the electrolytic product of the electrolyte solution generated in electrolysis unit 11 can be produced as intended with high accuracy.

Note that, the above exemplary embodiment is to exemplify the techniques in the present disclosure, and therefore, various modifications, replacements, additions, omissions, and the like can be made in the scope of the appended claims or in an equivalent scope thereof.

For example, in the exemplary embodiment described above, the configuration in which four protrusions are provided on the conductive film has been described as an example, but the present invention is not limited thereto. For example, one to three, or five or more protrusions may be provided on the conductive film. That is, when there is at least one protrusion, the variation can be made smaller than when there is no protrusion. In addition, in the case of providing five or more protrusions, even if a part of the protrusion of the soft conductive film is bent at the time of assembly, the possibility of suppressing positional deviation by other protrusions can be increased. Accordingly, the effect of accurately generating the concentration of the electrolytic product of the electrolyte solution is exerted.

In addition, in the exemplary embodiment described above, the configuration as an example is described in which the protrusions respectively provided on both sides in the short side direction of the conductive film are disposed close to each other in the longitudinal direction of the conductive film, and specifically, the protrusion is disposed adjacent to the recess in the longitudinal direction, but the present invention is not limited thereto. For example, in the case of not providing the recess in the conductive film, the protrusions respectively provided on both sides in the short side direction of the conductive film may be disposed at the same position in the longitudinal direction of the conductive film. As a result, an effect of preventing deformation due to bending of the soft conductive film can be exerted.

Moreover, In the exemplary embodiment described above, the configuration in which the power feeder comes into contact with the anode is described as an example, but the present invention is not limited thereto. For example, the power feeder may be configured to be in contact with the cathode. In this case, a configuration in which the conductive film is disposed apart from the power feeder in contact with the cathode is preferable. As a result, the following phenomenon can be prevented. When the power feeder and the conductive film are in contact with each other, a current path that does not pass through the cathode is formed, and thus the product at the cathode is reduced.

INDUSTRIAL APPLICABILITY

The present disclosure is applicable to an electrolyte solution production device in which a conductive film can be downsized and the concentration of an electrolytic product in an electrolytically treated solution can be increased. The present disclosure can be specifically applicable to water treatment equipment such as water purifiers, washing machines, dish washers, warm water washing toilet seats, refrigerators, water heaters/servers, sterilizers, medical instruments, air conditioners, and kitchen equipment.

REFERENCE MARKS IN THE DRAWINGS

1: electrolyte solution production device
3: cathode (electrode)
3a, 23a: spring
3b, 23b: feed shaft
3c: cathode hole
3d, 5a, 7b, 23c: side surface
5: anode (electrode)
7: conductive film
7a: conductive film hole
9: stacked body
11: electrolysis unit
13: housing
15: inflow port
15a: hole
17: outlet port
19: protrusion
21: recess
23: power feeder
25: restriction part
27: elastic body
29, 31: interface
33: groove
35: flow path
37: electrode case
39: electrode case lid
41: bottom wall
41a, 43a: inner surface
43: peripheral wall
45: flange
47: housing recess
49: through-hole
51: fitting protrusion
53: projection
55: O-ring
157: washer
59: spring washer
161: hex nut
63: lid body
65: flow path protrusion
67: fitting recess
69: groove
71: flow path groove
73: positioning recess
75: positioning protrusion
77: space
79: projection
X: liquid flowing direction (other direction)
Y: width direction (predetermined one direction)
Z: stacking direction (thickness direction of conductive film)

The invention claimed is:

1. An electrolyte solution production device comprising:
an electrolysis unit configured to electrolyze a liquid, the electrolysis unit including a stacked body having a cathode, an anode, and a conductive film between the cathode and the anode, the cathode and the anode constituting electrodes adjacent to each other; and
a housing in which the electrolysis unit is disposed, wherein:
the housing includes an inflow port through which the liquid is supplied to the electrolysis unit and an outlet port through which an electrolyte solution produced in the electrolysis unit flows out from the electrolysis unit,
the conductive film includes a protrusion that protrudes toward an inner surface of the housing along a width direction which is a short side direction of the conductive film and positions the conductive film with respect to the housing,
the housing includes a restriction part that is disposed to face the protrusion and positions the conductive film with respect to a liquid flowing direction orthogonal to the width direction,
the protrusion is in contact with an inner surface of a peripheral wall of the housing, and one side of the protrusion is in contact with the restriction part and another side of the protrusion opposite to the one side in the liquid flow direction is in contact with no restriction part.

2. The electrolyte solution production device according to claim 1, wherein:
 a plurality of protrusions are respectively provided on both sides of the conductive film, the both sides extending in the liquid flowing direction, and
 a distance along the liquid flowing direction between one of the two or more of the plurality of protrusions on a one side of the both sides and one of the two or more of the plurality of protrusions on another side of the both sides is smaller than a distance along the liquid flowing direction between two of the two or more of the plurality of protrusions on one of the both sides.

3. The electrolyte solution production device according to claim 1, wherein:
 the conductive film comprises an upstream half and a downstream half along the liquid flowing direction, and
 at least one protrusion is provided to the upstream half and the downstream half at the both sides.

4. The electrolyte solution production device according to claim 1, wherein
 the stacked body includes a power feeder that is in contact with at least one of the electrodes on a side opposite to the conductive film, and
 the conductive film is disposed apart from the power feeder.

5. The electrolyte solution production device according to claim 1, wherein
 the protrusion is in contact with the restriction part in the liquid flow direction.

6. The electrolyte solution production device according to claim 1, wherein
 a plurality of protrusions are respectively provided on both sides of the conductive film, the both sides extending in the liquid flowing direction, and
 at least two restriction parts are provided to correspond to two of the plurality of protrusions disposed on both sides of the conductive film, respectively.

7. An electrolyte solution production device comprising:
 an electrolysis unit configured to electrolyze a liquid, the electrolysis unit including a stacked body having a cathode, an anode, and a conductive film between the cathode and the anode, the cathode and the anode constituting electrodes adjacent to each other; and
 a housing in which the electrolysis unit is disposed, wherein:
 the housing includes an inflow port through which the liquid is supplied to the electrolysis unit and an outlet port through which an electrolyte solution produced in the electrolysis unit flows out from the electrolysis unit,
 the conductive film includes a protrusion that protrudes toward an inner surface of the housing and positions the conductive film with respect to the housing,
 a plurality of protrusions are respectively provided on both sides of the conductive film, the both sides extending in a liquid flowing direction that crosses a width direction which is a short side direction of the conductive film,
 each of the both sides of the conductive film includes two or more of the plurality of protrusions,
 the electrolyte solution production device further comprises a power supply unit, and the power supply unit is configured to apply a voltage between the cathode and the anode to generate a voltage difference between the cathode and the anode, and
 the conductive film includes a recess provided on one of the both sides at a position opposite to a position where one of the plurality of protrusions is provided.

8. An electrolyte solution production device comprising:
 an electrolysis unit configured to electrolyze a liquid, the electrolysis unit including a stacked body having a cathode, an anode, and a conductive film between the cathode and the anode, the cathode and the anode constituting electrodes adjacent to each other; and
 a housing in which the electrolysis unit is disposed, wherein:
 the housing includes an inflow port through which the liquid is supplied to the electrolysis unit and an outlet port through which an electrolyte solution produced in the electrolysis unit flows out from the electrolysis unit,
 the conductive film includes a first protrusion that is provided on a first side of the conductive film and protrudes in a width direction of the conductive film toward a first inner surface of the housing and positions the conductive film with respect to the housing, the first side extending in a liquid flowing direction crossing the width direction, and
 the conductive film includes a first recess provided on a second side opposite to the first side of the conductive film at a position opposite to a position where the first protrusion is provided on the first side.

9. The electrolyte solution production device according to claim 8, wherein:
 the conductive film includes a second protrusion that is provided on the second side of the conductive film and protrudes toward a second inner surface of the housing.

10. The electrolyte solution production device according to claim 9, wherein the conductive film includes a second recess provided on the first side of the conductive film at a position opposite to a position where the second protrusion is provided on the second side.

11. The electrolyte solution production device according to claim 8, wherein the conductive film includes a second protrusion that is provided on the first side of the conductive film and protrudes toward the first inner surface of the housing.

12. The electrolyte solution production device according to claim 11, wherein the conductive film includes a second recess that is provided on the second side at a position opposite to a position where the second protrusion is provided on the first side.

13. The electrolyte solution production device according to claim 8, wherein:
 the stacked body includes a power feeder that is in contact with at least one of the electrodes on a side opposite to the conductive film, and
 the conductive film is disposed apart from the power feeder.

14. The electrolyte solution production device according to claim 8, wherein the housing includes a restriction part that is disposed to face the protrusion and positions the conductive film with respect to the liquid flowing direction.

15. The electrolyte solution production device according to claim 8, wherein:
 the conductive film includes a second protrusion that protrudes in a direction different from the width direction.

16. The electrolyte solution production device according to claim 8, further comprising a power supply unit configured to apply a voltage between the cathode and the anode to generate a voltage difference between the cathode and the anode.

\* \* \* \* \*